United States Patent

Urry

[11] Patent Number: 5,962,163
[45] Date of Patent: Oct. 5, 1999

[54] ALKALINE CELL WITH GEL TYPE ANODE HAVING CENTRALLY DISPOSED GELLING AGENT ABSORBENT

[75] Inventor: Lewis F. Urry, Elyria, Ohio

[73] Assignee: Eveready Battery Company, Inc., St. Louis, Mo.

[21] Appl. No.: 08/918,984

[22] Filed: Aug. 27, 1997

[51] Int. Cl.[6] .................................................. H01M 2/02
[52] U.S. Cl. .......................... 429/164; 429/300; 429/229; 29/623.1; 29/623.5
[58] Field of Search .................... 429/300, 229, 429/164; 29/623.1, 623.5

[56] References Cited

U.S. PATENT DOCUMENTS

| | | | |
|---|---|---|---|
| 2,960,558 | 11/1960 | Marsal et al. | 429/63 |
| 3,884,721 | 5/1975 | Tucholski | 429/206 |
| 3,884,722 | 5/1975 | Tucholski | 429/54 |
| 4,175,052 | 11/1979 | Norteman, Jr. | 252/182.1 |
| 4,963,447 | 10/1990 | Nishimara et al. | 429/206 |
| 5,348,816 | 9/1994 | Shinoda et al. | 429/206 |
| 5,376,480 | 12/1994 | Shinoda et al. | 429/206 |
| 5,389,457 | 2/1995 | Urry | 429/66 |
| 5,587,254 | 12/1996 | Kojima et al. | 429/206 |

FOREIGN PATENT DOCUMENTS

| | | |
|---|---|---|
| 0414990 | 3/1991 | European Pat. Off. . |
| 0678927 | 10/1995 | European Pat. Off. . |

OTHER PUBLICATIONS

Mototani, Yuji, *Zero Mercury Use Alkaline Batteries*, National Technical Report, vol. 40, No. 4, Aug. 1994.

*Primary Examiner*—Maria Nuzzolillo
*Assistant Examiner*—Laura Weiner
*Attorney, Agent, or Firm*—Robert W. Welsh; Stewart A. Fraser

[57] ABSTRACT

An alkaline cell having an anode with a solid particle gelling agent centrally disposed therein for increasing concentration of zinc powder closer to the separator and cathode. The anode initially contains zinc powder, gelling agent and electrolyte solution. A dry solid gelling agent, preferably configured as a cylindrical rod, is disposed into a gel anode and allowed to absorb electrolyte solution, the rod thereby swelling in size to consume greater volume while concentrating the zinc powder toward the separator.

27 Claims, 2 Drawing Sheets

ALKALINE CELL WITH GEL TYPE ANODE HAVING CENTRALLY DISPOSED GELLING AGENT ABSORBENT

BACKGROUND OF THE INVENTION

The present invention generally relates to an electrochemical cell, and more particularly relates to an improved anode for an alkaline cell having large particle gelling agent material disposed in the anode.

Conventional alkaline cells commonly use a gelled negative electrode, commonly referred to as the anode, which contains carboxymethyl cellulose (CMC), cross-linking type branched polyacrylic acid or a sodium salt thereof, natural gum, or the like as a gelling agent. The gelled anode is commonly formed by uniformly dispersing zinc powder in a gelled electrolyte, with the CMC as a gelling agent. The gelled anode typically retains a good gel state initially, however, with the passage of time, the CMC generally undergoes syneresis, and the anode falls out of the gel state. Also, the zinc powders, which have a large specific gravity, precipitate to reduce the effective surface area for reaction of the zinc. As a consequence, the alkaline cell may suffer a reduction in discharge performance.

To further add to the above-identified problem, when a cell is subjected to strong shock, e.g., when the cell is dropped or strong vibration is exerted thereon, the shock can cause the contact among zinc particles dispersed in the gelled electrolyte and/or that between the zinc particles and the anode current collector to become unstable. As a result, the electricity production effect of the cell may become unstable or incomplete.

One approach to preventing the above-identified problems has been to increase the volume content of the zinc powder in the gelled anode so that the degree of contact among the zinc particles and the collector is increased. When this is done, however, it is also necessary to increase the zinc powder volume considerably. Yet, if the concentration of zinc particles is too high, the packing of the zinc oxide and hydroxide product of discharge is so high as to block off ion diffusion. Also, if the zinc per cell is too high, the volume balance between the anode and cathode is lost, which can lead to a high gassing on deep discharge of the cell.

According to another approach, it is generally known to use a plurality of large particle nuggets uniformly dispersed throughout the anode mix of an alkaline cell so as to consume anode volume and have the effect of increasing zinc powder concentration in those portions of the anode that are not occupied by the nuggets. One example of the use of large particle nuggets is disclosed in U.S. Pat. No. 3,884,721, which is hereby incorporated by reference. The cell disclosed in the aforementioned issued patent employs a cross-linked polyacrylamide that absorbs alkaline electrolyte to form "electrolyte nuggets." With this approach, both the electrolyte nuggets and the zinc powder are distributed evenly throughout the anode so as to realize an increase in the zinc concentration in the non-nugget regions and an increase in the permeability of gas in the anode without exceeding the desired maximum of zinc per cell. Yet, the need to find new ways to increase service performance remains the primary goal of the cell designers.

SUMMARY OF THE INVENTION

The present invention improves the performance of alkaline cells by concentrating zinc powder in the anode closer to the interface with the cathode. To achieve this and other advantages, and in accordance with the purpose of the invention as embodied and described herein, the present invention provides an alkaline cell and method of manufacturing such an alkaline cell. The alkaline cell includes a gelled anode separated from a cathode via a separator. The gelled anode initially contains zinc powder and a gelling agent mixed with an electrolyte solution to provide a low viscosity mixture. During assembly of the cell, a dry gelling agent material is disposed within a central portion of the low viscosity anode mixture. According to one embodiment, the dry gelling agent material is provided as a solid cylindrical rod centrally disposed along the longitudinal axis of a cylindrical alkaline cell. The dry gelling agent absorbs electrolyte solution and thereby swells so as to increase viscosity of the anode, while concentrating the zinc powder in an outer peripheral region of the anode in close proximity to the separator interface and cathode.

These and other features, objects, and benefits of the invention will be recognized by those who practice the invention and by those skilled in the art, from reading the following specification and claims, together with reference to the accompanying drawings.

As used in this invention, the term "zinc powder" shall mean any size, form, or type of zinc that can be used to form a gelled anode for alkaline cells. In addition to the preferred powder, other forms of zinc that are useful in this invention include spheres; rods; needles; flakes; irregular and regular shaped particles. The use of shapes other than powders may provide advantages in performance and/or processing. Some advantages include improving high rate discharge performance, and providing for accumulation of reaction by-products, among others.

BRIEF DESCRIPTION OF THE DRAWING FIGURES

Figure 4:
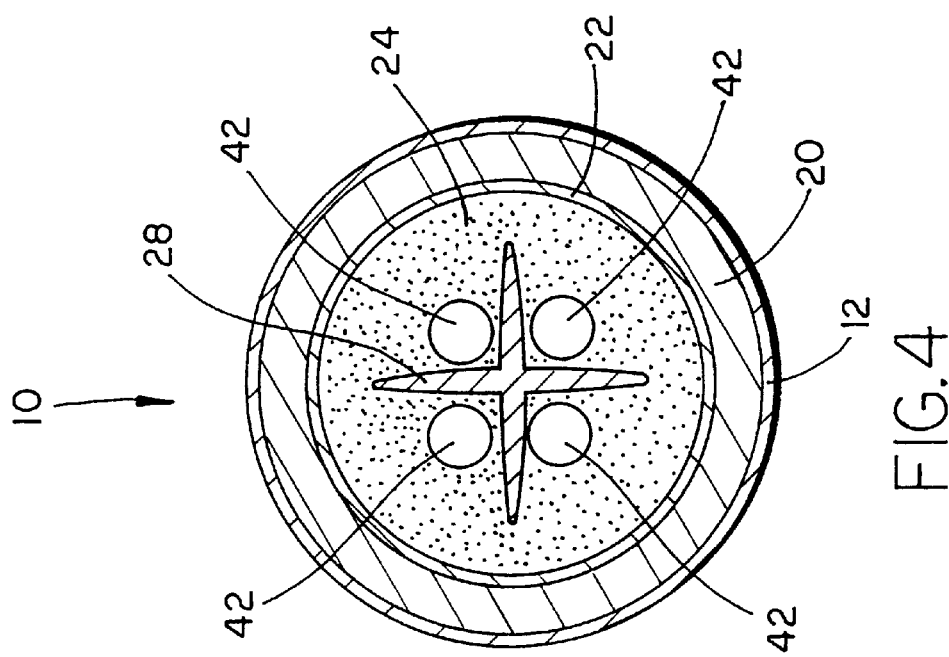
Figure 5:
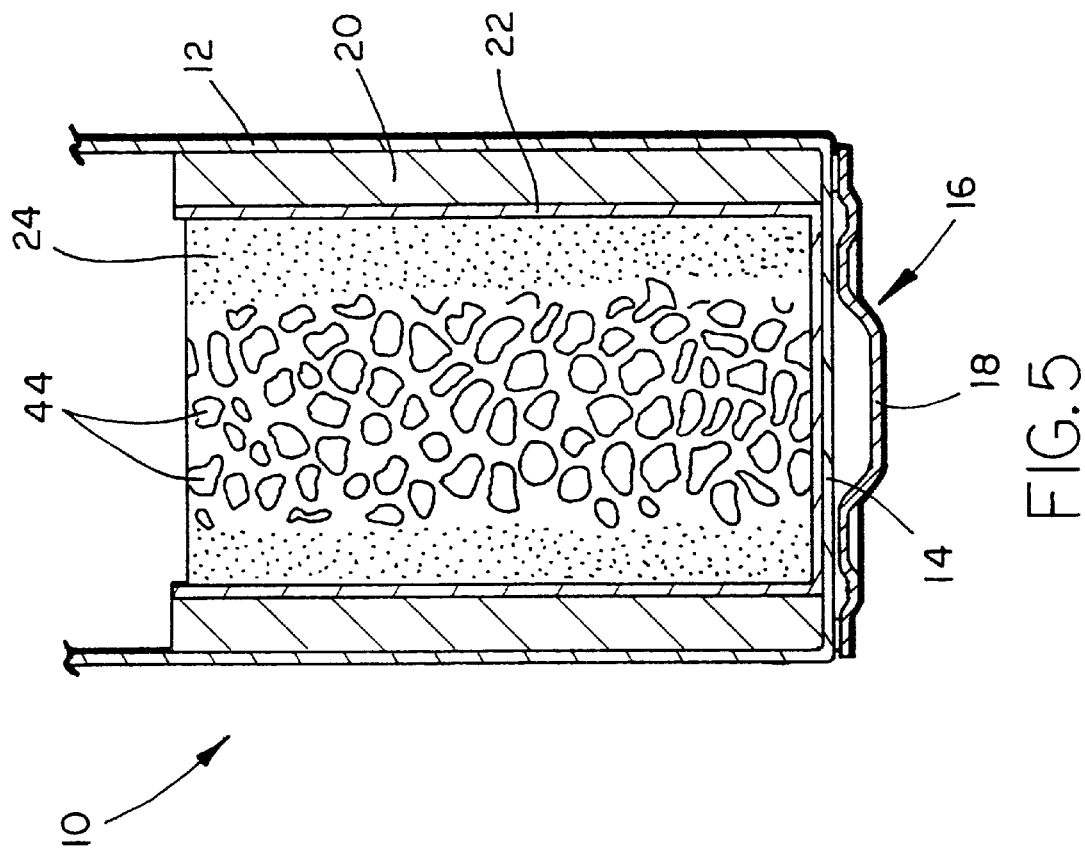

FIG. 4 is a top view of a cross section of a cylindrical alkaline cell illustrating four cylindrical rods of dry gelling agent disposed in the anode in accordance with an alternate embodiment of the present invention; and FIG. 5 is a cut-away, cross-sectional view of a cylindrical alkaline cell having a plurality is of swollen gelling agent nuggets centrally disposed in the anode in accordance with yet another embodiment of the present invention.

DETAILED DESCRIPTION OF THE PREFERRED EMBODIMENTS

Figure 3:
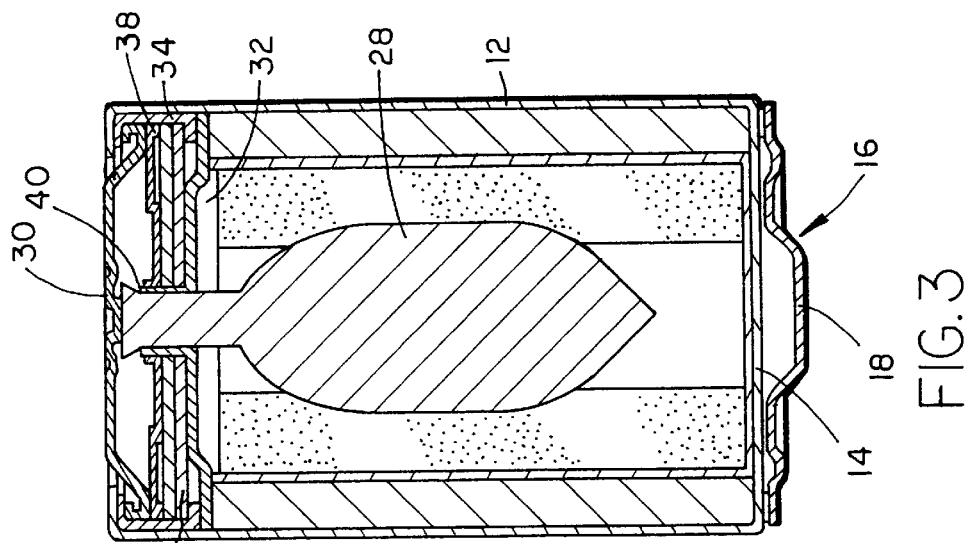
FIG. 3 is a cut-away, cross-sectional view of the fully assembled cell illustrating the swelled cylindrical rod and a zinc blade collector centrally disposed in the anode in accordance with the present invention.
Figure 2:
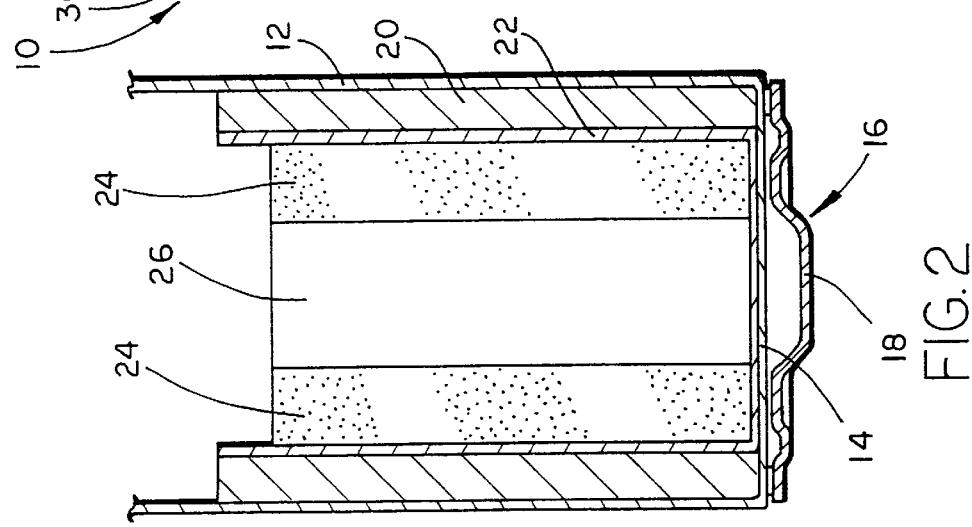
FIG. 2 is a cut-away, cross-sectional view of the cell illustrating swelling of the cylindrical rod upon absorbing electrolyte in the anode.
Figure 1:
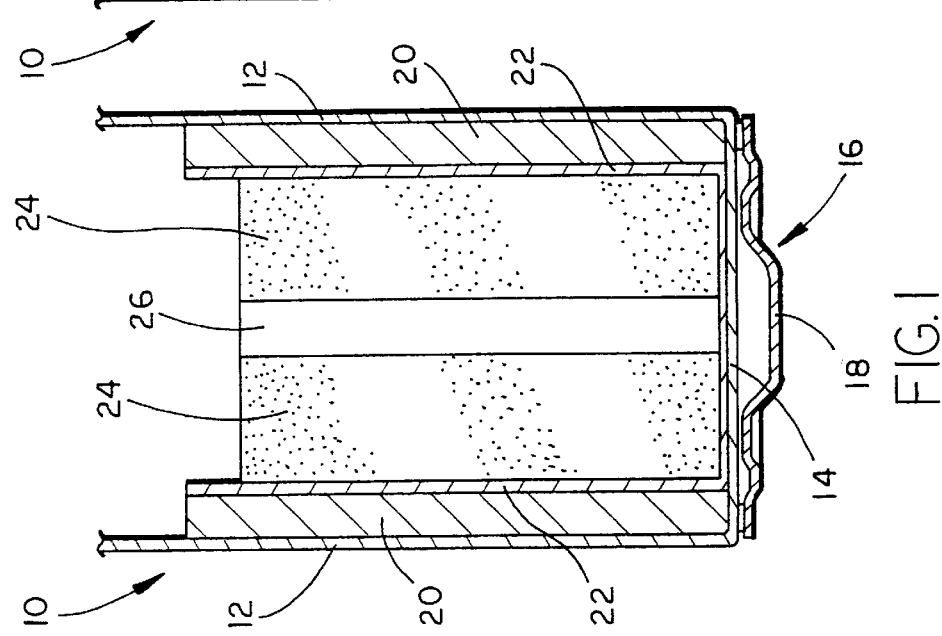
FIG. 1 is a cut-away, cross-sectional view of a cylindrical alkaline cell illustrating the insertion of a solid cylindrical rod of dry gelling agent centrally disposed in the anode during manufacturing.

Turning now to FIGS. 1–3, the construction of a partially manufactured alkaline battery cell 10 is shown according to one embodiment of the present invention. The alkaline battery cell 10 includes a steel can 12 having a cylindrical shape with one open end. A metallized, plastic film label (not shown) is formed about the exterior surface of steel can 12 except for the ends of steel can 12. At a closed end 14 of steel can 12 is a positive cover 16 preferably formed of plated steel with a protruding nub 18 at its center which forms the positive contact terminal of the battery. A cathode 20, preferably formed of a mixture of manganese dioxide, graphite, potassium hydroxide solution, deionized water, and a TEFLON® suspension is formed about the interior side surface of steel can 12. A cup-shaped separator 22, which is preferably formed of a non-woven fabric that prevents migration of any solid particles in the battery, is disposed about the interior surface of cathode 20. A gelled anode 24 is injected into or otherwise disposed within the interior of the separator 22.

The anode 24 is a gel type anode, and preferably a pregelled anode, formed of nonamalgamated zinc powder, a gelling agent, and all other additives, and mixed with an electrolyte solution which may be formed of potassium hydroxide, zinc oxide, and water. The gelling agent may include a high viscosity binder having a cross-linking type branched polyacrylic acid, such as Carbopol®, which is manufactured and made available by B.F. Goodrich Specialty Chemicals. The anode additives may include corrosion preventives such as sodium silicate and indium hydroxide. Examples of suitable gelled anodes are disclosed in U.S. Pat. Nos. 5,587,254 and 4,963,447, both of which are hereby incorporated by reference.

Prior to assembly of the cell 10, the anode mix 24 can be formed by mixing the zinc powder, gelling agent, electrolyte solutions, and additives together. The mixing can be accomplished by hand-kneading or mixing in a blender. During assembly of the cell 10, the zinc anode mix can be injected into the cup-shaped separator 22. When injected into separator 22, the anode mix preferably has a low viscosity and a uniform concentration of zinc powder dispersed throughout the anode mix.

With particular reference to FIG. 1, a dry, solid gelling agent, configured as a solid cylindrical rod 26 initially having a small diameter, is centrally disposed in the low viscosity anode and electrolyte mixture. Rod 26 is preferably centered in the anode and extends along a longitudinal axis of the cell 10. Rod 26 is composed of a dry, solid material, preferably similar to and compatible with the gelling agent of the pregelled anode. Such gelling agent can be composed solely or mainly of a cross-inked polyacrylic acid. However, in contrast to the gelling agent of the pregelled anode, the gelling agent of rod 26 is instead initially hydrated and dried before being disposed in the anode as a dry, solid material, and is configured in the shape of a thin spaghetti-like rod. Examples of dry gelling agent material suitable for rod 26 may include Carbopol®, such as Carbopol 940, which is manufactured and made available by B.F. Goodrich Specialty Chemicals. Another suitable example of dry gelling agent material may include a granular preparation of cassava starch.

The solid cylindrical rod 26 can be manufactured as provided in the following example. Add 400 ml of deionized water to a mixer and add 93.5 grams of Carbopol 940 to the water in small amounts, allowing the particles to hydrate without lumping together. Continue to add all of the remaining Carbopol 940 to the water until the solution becomes saturated. When saturated, the solution will have a consistency of jelly. Next, form the jelly-like solution into cylindrical rods and place the jelly-like cylindrical rods on a stainless steel cake pan. The cylindrical rod formation could be accomplished with a spaghetti rod extruding machine. Place the pan of jelly-like rods in a vented oven at 100° C. for 24 hours or until the water evaporates. Remove the pan from the oven and cool. The dehydrated cylindrical rods are now dry and solid and may be cut to the appropriate length and disposed in the anode mix of an alkaline cell according to the present invention.

Once the solid cylindrical rod 26 is disposed in the anode for a period of time, the dry solid gelling agent rod 26 absorbs liquid electrolyte solution from the low viscosity gelled anode 24. As a consequence, the cylindrical rod 26 swells and thereby increases in size as shown in FIG. 2. Absorption of electrolyte solution by the dry gelling rod 26 increases the volume that cylindrical rod 26 consumes in the anode cavity, while at the same time increases the viscosity of the anode. While the cylindrical rod 26 absorbs liquid electrolyte solution in a central portion of the anode, the zinc powder does not permeate the swelling rod 26, and therefore zinc powder is not absorbed into swelling rod 26. Accordingly, swelling rod 26 is substantially free of zinc powder and, once swelled, rod 26 consumes a greater volume in the central portion of the anode 24. This causes the zinc powder to concentrate in the peripheral region of the anode cavity with an increased zinc concentration in closer proximity to the separator 22.

Referring to FIG. 3, the alkaline cell 10 is shown configured as fully assembled with a current collector 28 and a negative cover 30. Once the dry gelling agent has absorbed the liquid electrolyte solution and swelled to reach its substantially swelled volume, the current collector 28 is inserted into anode 24 and in current contact with the zinc concentration in the anode 24. According to a preferred embodiment, the current collector 28 includes a zinc-coated blade extending into anode 28 through the swelling rod 26, and portions of the current collector 28 are in direct contact with the zinc powder concentration.

The current collector 28, as shown, is configured as a zinc-coated blade having four, equiangularly displaced, radially extending blades. The current collector 28 is inserted such that the tip and radially extending blades cut through the swelling rod 26. The outer radially extending portions of the blade of collector 28 are intended to contact the zinc powder concentration in the anode 24. The current collector 28 is preferably coated with zinc such that, should poor contact exist between current collector 28 and the zinc concentration in anode 24, the zinc coating on current collector 28 can provide additional service for the alkaline cell 10. Current collector 28 could have various other configurations for contacting the zinc powder concentration in anode 24. For example, a two-prong current collector, such as a U-shaped wire, could be used with the two prongs projecting into the periphery of the anode in contact with the zinc powder concentration. It should be appreciated that various other types and configurations of current collectors could be employed without departing from the spirit of the present invention.

Next, the open end of steel can 12 is closed up as the negative cover 30 is assembled. With the cell 10 fully assembled, current collector 26 contacts a brass rivet 40 projecting through a nylon seal 34 formed at the open end of steel can 12 to prevent leakage of the active ingredients contained in steel can 12. Nylon seal 34 contacts a metal washer 36 and an inner cell cover 38, which is preferably formed of steel. The negative cover 30, which is preferably formed of a plated steel, is disposed in contact within an inner cell cover 38 and brass rivet 40. Rivet 40 contacts current collector 26 through a hole formed in nylon seal 34. Negative cover 30 is electrically insulated from steel can 12 by nylon seal 34.

Referring now to FIG. 4, alkaline cell 10 is shown configured with four cylindrical swelling rods 42 according to an alternative embodiment of the present invention. The four cylindrical rods 42 are each equiangularly disposed between adjacent blades of the four-blade current collector 28. In the solid unswelled state, rods 42 can be fixedly attached to current collector 28 and together disposed into the anode. According to this embodiment, the four cylindrical swelling rods 42 are disposed around the current collector 28 substantially near the central portion of anode 24 so as to absorb the electrolyte solution and disperse zinc powder concentration in the outer peripheral region of anode 24.

In FIG. 5, a plurality of large particle swelling nuggets 44 are shown centrally disposed within anode 24 of the alkaline cell 10 according to yet another embodiment of the present invention. The large particle swelling nuggets 44 are initially composed of the same material as cylindrical rod 26, but instead are configured as dry, solid particles which are injected into the low viscosity anode gel. Swelling nuggets are initially hydrated and dried into solid dry particles in a heated oven and subsequently blended to the desired size. However, in order to achieve placement of the swelling nuggets 44 along the central portion of anode 24, cell 10 can be centrifuged along its central axis so as to concentrate the low density swelling nuggets 44 along the central axis and concentrate the high density zinc powder at the outer peripheral region of anode 24. The step of centrifuging the alkaline cell 10 could be performed immediately following disposing of the swelling nuggets 44 within the anode 24 and prior to substantial absorption of electrolyte therewith. One example of centrifuging a cylindrical alkaline cell 10 is disclosed in U.S. Pat. No. 2,960,558 entitled "Dry Cell," which is also hereby incorporated by reference.

The pregel anode with large particle nuggets can be made according to the following example. A dry blend is used to manufacture anodes that contain pregel and/or nuggets. For an anode with pregel, weigh the ingredients of zinc powder and indium and mix, with a mixer, on low speed for approximately 5 minutes. Add 0.1 N potassium hydroxide/water solution and mix for 5 minutes on low speed. Add the pregel into the mixing bowl and mix for 35 to 40 seconds. Mix again for 15 to 20 seconds while sprinkling 60 mesh nuggets on top. Inject the pregel anode with nuggets into the cup-shaped separator. Centrifuge the cell to disperse the zinc powder to the peripheral region of the anode cavity. Allow the anode to age for one day before use to allow for the nuggets to fully hydrate. At the inner portion of the anode, the resulting mixture is a gelled electrolyte having a nugget-like appearance and an average particle diameter of greater than 1000 microns. At the outer peripheral region of the cell is an increased concentration of zinc particles.

The alkaline cell 10 of the present invention advantageously provides an anode with increased zinc concentration in closer proximity to the separator where optimum utilization can be realized to increase cell discharge efficiency.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A method for manufacturing an alkaline cell comprising:
    providing a cathode;
    providing a separator having a first face and a second face with the first face on the cathode;
    preparing an anode mixture containing a mixture of zinc powder and an electrolyte solution, and initially having a low viscosity;
    disposing the anode mixture on the second face of the separator; and
    disposing a solid gelling agent in a central portion of the anode mixture such that the solid gelling agent absorbs at least some of the electrolyte solution so as to provide a nonuniform distribution of zinc powder throughout the anode mixture with the concentration of zinc powder being greater adjacent to the separator than in the central portion of the anode mixture.

2. The method as defined in claim 1, further comprising the step of mixing a second gelling agent with said anode mixture.

3. The method as defined in claim 1, wherein said solid gelling agent is injected as a plurality of nuggets.

4. The method as defined in claim 1, further comprising the steps of: allowing the gelling agent to swell; and subsequently, inserting a current collector blade into the anode mixture, said current collector penetrating the swelled gelling agent.

5. A method for manufacturing an alkaline cell comprising:
    providing a cathode;
    providing a separator having a first face and a second face with the first face on the cathode;
    preparing an anode mixture containing a mixture of zinc powder and an electrolyte solution, and initially having a low viscosity;
    disposing the anode mixture on the second face of the separator; and
    disposing a solid gelling agent in a central portion of the anode mixture such that the solid gelling agent absorbs at least some of the electrolyte solution so as to increase the concentration of zinc powder disposed adjacent to the separator, wherein said solid gelling agent is injected into the anode mixture as a cylindrical rod.

6. A method for manufacturing a cylindrical alkaline cell comprising:
    disposing a cathode within an outer cylindrical portion of a cylindrical can;
    providing a separator disposed inside the cathode;
    disposing a low viscosity mixture of zinc powder, first gelling agent and electrolyte solution within the separator so as to provide a gel anode; and
    disposing a dry solid second gelling agent in the gel anode such that the dry gelling agent absorbs the electrolyte solution so as to provide a nonuniform distribution of zinc powder and gelling agent throughout the anode with the concentration of zinc powder disposed adjacent to the separator being greater than that in the central portion of the anode.

7. The method as defined in claim 6, wherein said first and second gelling agents are made of the same material.

8. An alkaline cell comprising:
    a cathode;
    an anode containing zinc powder and electrolyte solution;
    a separator disposed between the cathode and the anode;
    a current collector disposed in said anode and in contact with said zinc powder; and
    a large particle gelling agent centrally disposed within the anode, said large particle gelling agent being substantially zinc free and containing absorbed electrolyte solution so as to provide a zinc powder concentration in the anode that is greater adjacent to the separator than in a central portion of the anode.

9. The alkaline cell as defined in claim 8, wherein said large particle gelling agent is disposed along a central longitudinal axis of the cell.

10. The alkaline cell as defined in claim 9, wherein said large particle gelling agent is configured as a plurality of nuggets.

11. The alkaline cell as defined in claim 8, wherein said large particle gelling agent comprises polyacrylic acid.

12. The alkaline cell as defined in claim 8, wherein said gelling agent comprises cassava starch.

13. The alkaline cell as defined in claim 8, wherein the large particles of gelling agent have an average diameter of greater than 1000 microns.

14. An alkaline cell comprising:
   a cathode;
   an anode containing zinc powder and electrolyte solution;
   a separator disposed between the cathode and the anode;
   a current collector disposed in said anode and in contact with said zinc powder; and
   a large particle gelling agent centrally disposed within the anode, said large particle gelling agent being substantially zinc free and containing absorbed electrolyte solution so as to increase zinc powder concentration adjacent to the separator, wherein said large particle gelling agent is configured as a cylindrical rod axially disposed within the anode along a central longitudinal axis of the cell.

15. The alkaline cell as defined in claim 14, wherein said current collector comprises a blade disposed within the anode and inserted within the cylindrical rod of gelling agent and extending into the zinc powder concentration.

16. The alkaline cell as defined in claim 15, wherein said blade is coated with zinc.

17. A cylindrical alkaline cell comprising:
   a cylindrical can having a central longitudinal axis;
   a cathode disposed within the can;
   a separator disposed inside the cathode;
   a gel anode disposed within said separator, said anode containing zinc powder, a first gelling agent and an electrolyte solution;
   a collector disposed within the anode and in contact with the zinc powder; and
   a cylindrical rod of a second gelling agent disposed within the anode along said central axis, said cylindrical rod being substantially zinc-free and containing absorbed electrolyte solution, said zinc powder concentrated at an outer periphery of the anode between the cylindrical rod and separator.

18. The alkaline cell as defined in claim 17, wherein said first and second gelling agents are made of the same material.

19. An alkaline cell comprising:
   a cathode;
   a gelled anode containing zinc powder, a first gelling agent and electrolyte solution;
   a separator disposed between the cathode and the anode;
   a collector disposed in the anode and in contact with the zinc powder; and
   a large particle second gelling agent disposed within a central portion of the anode containing absorbed electrolyte solution and substantially free of zinc, wherein the zinc powder is nonuniformly distributed throughout the anode with a greater concentration of zinc powder at an outer peripheral portion of the anode between the large particle gelling agent and the separator than in the central portion of the anode.

20. The alkaline cell as defined in claim 19, wherein said first and second gelling agents are made of the same material.

21. The alkaline cell as defined in claim 19, wherein the large particles of said second gelling agent have an average diameter of greater than 1000 microns.

22. An improved anode for use in an alkaline cell, said anode comprising zinc powder, a first gelling agent, electrolyte solution, and a large particle second gelling agent, said large particle second gelling agent being disposed within a central portion of the anode and containing absorbed electrolyte and substantially free of zinc, such that the zinc powder is nonuniformly distributed throughout the anode with a greater concentration of zinc powder at an outer peripheral region of the anode than in the central portion of the anode.

23. The anode as defined in claim 22, wherein said first and second gelling agents are made of the same material.

24. The anode as defined in claim 22, wherein the large particles of said second gelling agent have an average diameter of greater than 1000 microns.

25. An improved anode for use in an alkaline cell, said anode comprising zinc powder, a first gelling agent, electrolyte solution, and a large particle second gelling agent, said large particle second gelling agent being disposed within a central portion of the anode and containing absorbed electrolyte and substantially free of zinc, such that the zinc powder is concentrated at an outer peripheral region of the anode, wherein said large particle gelling agent comprises a cylindrical rod.

26. An alkaline cell comprising:
   a cathode;
   an anode containing zinc and electrolyte gelling agent;
   a separator disposed between the cathode and the anode;
   a collector having a plurality of radially extending blades, said collector disposed in the anode so as to provide contact to the zinc; and
   a plurality of rods of dry gelling agent disposed in the anode such that one of said rods is disposed between adjacent radially extending blades of the collector, said rods having absorbed electrolyte gelling agent and thereby dispersing concentration of the zinc to an outer periphery of the anode.

27. The alkaline cell as defined in claim 26, wherein said plurality of radially extending blades of the collector comprises four blades and said plurality of rods comprises four rods.

* * * * *